United States Patent [19]
Kakogawa et al.

[11] Patent Number: 4,507,450
[45] Date of Patent: Mar. 26, 1985

[54] PROCESS FOR PREPARING POLYOLEFIN

[75] Inventors: Genjiro Kakogawa; Masayoshi Hasuo; Yoshinori Suga; Kazuhisa Kojima, all of Yokohama, Japan

[73] Assignee: Mitsubishi Chemical Industries Limited, Tokyo, Japan

[21] Appl. No.: 818,754

[22] Filed: Jul. 25, 1977

[30] Foreign Application Priority Data

Aug. 18, 1976 [JP] Japan ................................. 51-98443
Mar. 23, 1977 [JP] Japan ................................. 52-31782

[51] Int. Cl.$^3$ .......................... C08F 4/02; C08F 10/06
[52] U.S. Cl. ...................................... 526/128; 502/116; 526/125; 526/127; 526/351
[58] Field of Search ................ 526/125, 128, 139, 141, 526/142

[56] References Cited

U.S. PATENT DOCUMENTS

| 2,905,645 | 9/1959 | Anderson et al. | 526/159 |
| 2,977,349 | 3/1961 | Brockway et al. | 526/128 |
| 3,058,972 | 10/1962 | Fourcade et al. | 526/128 |
| 3,755,274 | 8/1973 | Piekarski et al. | 526/128 |
| 3,787,384 | 1/1974 | Stevens et al. | 526/129 |
| 3,907,759 | 9/1975 | Okada et al. | 526/128 |
| 4,069,169 | 1/1978 | Toyota et al. | 526/906 |
| 4,107,414 | 8/1978 | Giannini et al. | 526/114 |
| 4,107,416 | 8/1978 | Giannini et al. | 526/125 |
| 4,221,894 | 9/1980 | Ushida et al. | 526/351 |
| 4,250,285 | 2/1981 | Minami et al. | 526/125 |

FOREIGN PATENT DOCUMENTS

| 2504036 | 8/1975 | Fed. Rep. of Germany | 526/125 |
| 918740 | 2/1963 | United Kingdom | 526/142 |
| 1128724 | 10/1968 | United Kingdom | 526/142 |
| 1286867 | 8/1972 | United Kingdom | 526/125 |
| 1292853 | 10/1972 | United Kingdom | 526/125 |
| 1391322 | 4/1975 | United Kingdom | 526/151 |

Primary Examiner—Edward J. Smith
Attorney, Agent, or Firm—Oblon, Fisher, Spivak, McClelland & Maier

[57] ABSTRACT

In a process for preparing polyolefin by polymerizing an olefin in the presence of a catalyst system combining an organo-aluminum compound and a titanium containing solid catalytic component prepared by mixing (a) a silanol compound (b) a Grignard reagent and (c) a titanium tetrahalide, the components (a) (b) or (c) or the reaction mixture of two or three components thereof is contacted with (d) one or more electron donor selected from the group consisting of amines, carboxylic acid amides, phosphines, phosphine oxides, phosphoric esters, phosphorous esters, phosphoric acid amides, ketones and carboxylic esters. The polyolefin having high isotactic index can be obtained.

6 Claims, No Drawings

PROCESS FOR PREPARING POLYOLEFIN

BACKGROUND OF THE INVENTION

1. Field of the Invention

The present invention relates to a process for preparing a polyolefin. More particularly, it relates to a process for preparing a polyolefin by polymerizing an olefin such as ethylene, propylene, butene-1 etc., in the presence of a catalyst having high catalytic activity comprising an organoaluminum compound and a carrier supported catalytic component.

2. Description of the Prior Art

Heretofore, it has been proposed to use various carrier supported catalytic component for a polymerization of an olefin. For example, it has been proposed, for the polymerization of ethylene to use a solid catalytic component prepared by reacting a titanium halide or a vanadium halide with a reaction product of $\alpha,\omega$-dihyroxydimethyl polysiloxane or diphenylsilane diol, etc. with a Grignard reagent in U.S. Pat. No. 3,907,759. However, when these catalysts are used, the stereospecific properties of the resulting polymers prepared by polymerizing an olefin especially propylene or butene-1, are remarkably low and the industrial value is not enough high.

SUMMARY OF THE INVENTION

It is an object of the present invention to provide a process for preparing a polyolefin having high stereospecific properties by using a catalyst having high catalytic activity.

It is another object of the present invention to provide a process for preparing a polyolefin having high isotactic index which can be used without separating a catalyst residue because of high K value of the catalyst.

The foregoing and other objects of the present invention have been attained by providing a process for preparing a polyolefin by polymerizing an olefin in the presence of a catalytic system combining an organoaluminum compound and a titanium containing solid catalytic component prepared by mixing (a) a silanol compound (b) a Grignard reagent (c) a titanium tetrahalide and (d) one or more electron donor selected from the group consisting of amines, carboxylic acid amides, phosphines, phosphine oxides, phosphoric esters, phosphorous esters, phosphoric acid amides, ketones and carboxylic esters, in suitable order.

DETAILED DESCRIPTION OF THE PREFERRED EMBODIMENTS

The titanium containing solid catalytic components used in the process of the present invention can be prepared by contacting
 (a) a silanol compound,
 (b) a Grignard reagent,
 (c) a titanium tetrahalide and
 (d) a specific electron donor.

These components used in the preparation will be illustrated.

(a) Silanol compound

The silanol compounds include silanols and polysilanols.

The silanols have the formula $$R_nSi(OH)_{4-n}$$

wherein R represents a hydrocarbon moiety and n is 1, 2 or 3.

The silanols can be easily produced by hydrolysis of the corresponding halides, for example:

$$(C_6H_5)_3SiCl + H_2O \rightarrow (C_6H_5)_3SiOH + HCl.$$

The resulting silanols have different stabilities depending upon kinds of the hydrocarbon moieties. Sometimes, a polysilanol is produced together with a silanol. The mixture of the polysilanol and the silanol can be used without any separation.

Suitable hydrocarbon moiety R include alkyl, cycloalkyl, cycloalkenyl, aryl, aralkyl, alkaryl and cycloaralkyl groups which have up to 20 of carbon atoms, especially alkyl groups such as methyl, ethyl, propyl, butyl, amyl, hexyl, heptyl, octyl and decyl groups; aryl groups such as phenyl group and aralkyl groups such as benzyl group.

The value n can be 1, 2 or 3 and it is preferably 2 or 3 from the viewpoint of stability of the silanol. The polysilanols can be easily produced by a hydrolysis of the corresponding organohalosilanes in suitable condition.

For example, one or more organohalosilane having the formula $$R_lSiX_{4-l}$$

wherein R represents a hydrocarbon moiety; X represents a halogen atom and l is 0 or an integer of 1 to 3; is used by reacting the organohalosilane with more than stoichiometric amount of water or an aqueous solution of a base to the halogen atom in the organohalosilane in an inert hydrocarbon solvent such as heptane, cyclohexane, benzene and toluene at $-50°$ to $100°$ C. preferably $-50°$ to $20°$ C., and then, washing the resulting reaction mixture to be neutral and drying it to obtain a solution of the polysilanol. The degree of polymerization of the polysilanol can be controlled depending upon the temperature in the hydrolysis and the concentration of a base.

The polysilanol can be separated by distilling the solvent from the solution. Thus, the solution can be used without separating the polysilanol.

The polysilanol can be also produced by heating one or more the above-mentioned silanol having the formula $$R_nSi(OH)_{4-n}$$

at higher than $50°$ C. in the presence of a base, preferably in an alcohol.

These polysilanols have various structures. For example, when the polysilanols are produced by the above-mentioned method using the organohalosilanes, the polysilanols having the formula $$(RSi)_x(OH)_yO_z$$

wherein R represents a hydrocarbon moiety and x, y, z respectively represent $x, y \geq 2$ and $z \geq 1$; can be obtained by the hydrolysis of organotrihalosilanes, and the polysilanols having the formula $$HO(R_2SiO)_mH \text{ or } (R_2SiO)_n$$

wherein R represents a hydrocarbon moiety and m and n respectively represent more than 2, can be obtained by the hydrolysis of the organodihalosilanes. In the hydrolysis of a mixture of the organotrihalosilane and the organodihalosilane, the cyclic and or chain polysilanols formed by condensing the polysilanols having the formulae each other can be obtained. The structures of the products are not clear.

The polysilanols used in the process of the present invention are compounds having siloxane bonds formed by condensing the above-mentioned silanol having the formula $R_nSi(OH)_{4-n}$.

The structure of the polysilanols can be chain structure, cyclic structure or net structure. The content of hydroxyl group in the polysilanol is more than one per one molecular, and it is preferably 4 to 14 m mole/g.

Suitable hydrocarbon moiety R in the above-mentioned formula of polysilanol or organohalosilane include alkyl, cycloalkyl, cycloalkenyl, aryl, aralkyl, alkaryl and cycloaralkyl groups which have up to 20 of carbon atoms, especially alkyl groups such as methyl, ethyl, propyl, butyl, amyl, hexyl, heptyl, octyl and decyl groups; aryl groups such as phenyl group and aralkyl groups such as benzyl group.

It is not necessary to use pure silanol compound. A mixture of two or more silanol compounds can be used. It is preferable to remove water and oxygen from the silanol compound by the dehydration and degasification before using it in the reaction with the Grignard reagent.

(b) Grignard reagents

The Grignard reagents have the formula

R'MgX wherein R' represents a hydrocarbon moiety and X represents a halogen atom.

Suitable hydrocarbon moiety R include alkyl, aryl and aralkyl groups which have up to 20 of carbon atoms, especially alkyl groups such as methyl, ethyl, propyl, butyl, amyl and hexyl groups; aryl groups such as phenyl; and aralkyl groups such as benzyl group. Suitable halogen atoms X include chlorine, bromine and iodine atoms.

The Grignard reagent is used in a form of an ether solution or an ether adduct. Suitable ethers include diethyl ether, dibutyl ether, dihexyl ether, dioctyl ether, tetrahydrofuran, tetrahydropyran, etc.

(c) Titanium tetrahalides

The titanium tetrahalides include titanium tetrachloride, tetrabromide, tetraiodide, etc. and it is preferable to use titanium tetrachloride.

(d) Electron donors

Suitable electron donors include amines, carboxylic acid amides, phosphines, phosphine oxides, phosphoric esters, phosphorous esters, phosphoric acid amides, ketones, and carboxylic esters. One or more electron donors can be used.

The carboxylic esters have a hydrocarbon moiety which can have a substituent of an amino group or an alkoxy group such as amino acid esters.

Suitable electron donors include amines such as tetramethyl ethylenediamine, tetraethyl ethylenediamine, etc.; carboxylic acid amides such as benzoic acid amide, acetamide, etc.; phosphines such as tris(nonylphenyl) phosphine, triphenyl phosphine, etc.; phosphine oxides such as triethylphosphine oxide, triphenylphosphine oxide, etc.; phosphoric esters such as triethyl phosphate, tributyl phosphate, etc.; phosphorous esters such as triphenyl phosphite, tris(nonylphenyl) phosphite, etc.; phosphoric acid amides such as hexamethyl phosphoric acid tri-amide etc.; and carboxylic esters such as methyl benzoate, ethyl benzoate, propyl benzoate, butyl benzoate, phenyl benzoate, methyl p-methoxybenzoate, ethyl p-methoxybenzoate, propyl p-methoxybenzoate, methyl p-methylbenzoate, ethyl p-methylbenzoate, butyl m-methoxybenzoate, phenyl o-methoxybenzoate, methyl p-ethoxybenzoate, ethyl p-ethoxybenzoate, phenyl acetate, phenyl propionate, ethyl crotonate, propyl crotonate, butyl crotonate, ethyl cinnamate, propyl cinnamate, butyl cinnamate, dimethylglycine ethyl ester, dimethylglycine propyl ester, dimethylglycine butyl ester, diphenylglycine ethyl ester, diphenylglycine butyl ester, ethyl p-dimethyl aminobenzoate, etc.; ketones such as acetone, methyl ethyl ketone, etc.

It is preferable to use carboxylic esters especially ethyl benzoate, methyl p-methylbenzoate, ethyl p-methylbenzoate.

In the process of the present invention, the four components (a), (b), (c) and (d) are contacted in suitable order to obtain the titanium containing solid component.

The titanium tetrahalide as (c) component is preferably used in the condition that the titanium tetrahalide (c) is added to the reaction mixture produced by reacting the silanol compound (a) with the Grignard reagent (b) or the reaction mixture produced by reacting the silanol compound (a) with the Grignard reagent (b) and the electron donor (d).

Thus, it is preferable to contact the silanol compound (a) with the Grignard reagent (b) before contacting them with the titanium tetrahalide (c).

The electron donor (d) is preferably used in the condition that the electron donor (d) is added to the reaction mixture produced by reacting the silanol compound (a) with the Grignard reagent (b) or the reaction mixture produced by reacting the silanol compound (a) with the Grignard reagent (b) and the titanium tetrahalide (c).

The typical examples contacting the components (a), (b), (c) and (d) are as follows:

(1) The silanol compound (a) is contacted with the Grignard reagent (b) to react them in the presence of the electron donor (d) and then, the titanium tetrahalide (c) is added to the reaction mixture.

(2) The silanol compound (a) is contacted with the Grignard reagent (b) to react them and the electron donor (d) is added and then the titanium tetrahalide (c) is added to the reaction mixture.

(3) The silanol compound (a) is contacted with the Grignard reagent (b) to react them and the titanium tetrahalide (c) is added the reaction mixture and then the electron donor (d) is added to it. The method (2) is preferable.

In the method of contacting the silanol compound, the Grignard reagent, the electron donor and the titanium tetrahalide, the contact can be carried out without any solvent or with suitable solvent in a form of solution.

Suitable solvents include aromatic hydrocarbons such as benzene, toluene; saturated aliphatic hydrocarbons such as n-pentane, n-hexane, n-heptane, n-octane, n-decane, liquid paraffin; alicyclic hydrocarbons such as cyclohexane, methylcyclohexane and ethers such as diethyl ether, dibutyl ether, etc.

Suitable methods of contacting the components to form the titanium containing catalytic component will be illustrated on the cases (1) to (3).

(1) The silanol compound (a) and the Grignard reagent (b) are added to the electron donor (d) at −50° to 100° C. preferably −30° C. to room temperature. The mixture is heated to 50° to 200° C. preferably 50° to 150° C. especially 70° to 90° C. to react them for 0.1 to 10 hours. It is preferable to prevent the reaction of the Grignard reagent with the electron donor before reacting the Grignard reagent with the silanol compound. Accordingly, when the electron donor easily reacts with the Grignard reagent, it is preferable to mix the silanol compound and the Grignard reagent at low temperature that the reaction of the electron donor with the Grignard reagent is not performed but the reaction of the silanol compound with the Grignard reagent is performed. The reaction mixture can be used without any separation. However, it is preferable to separate the reaction product as the solid by a decantation, a filtration, or a vaporization of the solvent from the reaction mixture. When the separation of the reaction product is carried out by the decantation or the filtration to obtain the solid. The solid is washed with an inert hydrocarbon solvent and it is added to the titanium tetrahalide and the mixture is treated at 60° to 150° C. preferably 80° to 130° C. for longer than 0.1 hour preferably 0.1 to 10 hours. In the treatment, the reaction product form by reacting the silanol compound with the Grignard reagent and the mixture of the reaction product with the titanium tetrahalide are preferably in a form of solution or swollen condition. Accordingly, the treatment is preferably carried out in a solvent suitable for dissolving or swelling them.

After the treatment, the solid catalytic component is separated from the reaction mixture and it is washed with an inert hydrocarbon solvent.

When the resulting catalytic component is dissolved in the reaction mixture, an inert hydrocarbon solvent is added to precipitate the catalytic component and it is separated and washed.

Suitable inert hydrocarbon solvents include aromatic hydrocarbons such as benzene, toluene; saturated aliphatic hydrocarbons such as n-pentane, n-hexane, n-heptane, n-octane, n-dodecane, liquid paraffin; alicyclic hydrocarbons such as cyclohexane, methyl cyclohexane, etc.

(2) The Grignard reagent (b) is added to a suspension or solution of the silanol compound (a) or vice versa at −50° to 100° C. preferably near room temperature to contact them. The reaction is performed at 50° to 200° C. preferably 50° to 150° C. especially 70° to 90° C. for 0.1 to 10 hours. The resulting reaction mixture or the solid separated from the reaction mixture by a filtration, a decantation or an evaporation of the solvent, is admixed with the electron donor (d) or a solution thereof. The mixture is preferably treated at 60° to 200° C. for longer than 0.1 hour preferably 0.1 to 10 hours especially 1 to 5 hours.

In the treatment, the reaction product produced by reacting the silanol compound with the Grignard reagent and the product produced by treating the reaction product with the electron donor are preferably in a form of a solution or swollen condition.

Accordingly, it is preferable to treat it in a solvent suitable for dissolving or swelling them.

Suitable solvents for the electron donor include aromatic hydrocarbons such as toluene, xylene; and aliphatic hydrocarbons such as hexane, heptane, etc.

The reaction mixture or the solid separated and washed as the same method described in the method (1) is treated with the titanium tetrahalide. The conditions for treating with the titanium tetrahalide and separating and washing the product can be the same with those of the method (1).

(3) The reaction of the silanol compound with the Grignard reagent is performed as the same with that of the method (2). The resulting reaction product is treated with the titanium tetrahalide as the same with that of the method (1) and then, it is treated with the electron donor as the same with that of the process (2).

The amounts of the components used in these methods are selected from the following ranges.

In the silanolcompounds, a molar ratio of hydroxyl group to number of Mg—C bonds in the Grignard reagent is in a range of 0.1 to 10 preferably 1 to 2. A molar ratio of the electron donor to Mg atoms is in a range of 0.01 to 10 preferably 0.05 to 1.0 especially 0.05 to 0.5. A molar ratio of the titanium tetrahalide to Mg atom is in a range of 0.1 to 50 preferably 1 to 20.

Thus, the pale yellowish brown solid having a titanium content of 0.01 to 20 wt.%, preferably 0.1 to 10 wt.%, especially 0.5 to 10 wt.% can be obtained by contacting the silanol compound, the Grignard reagent, the titanium tetrahalide and the electron donor.

The solid catalytic component is washed with the inert hydrocarbon solvent to use it in the polymerization of an olefin.

In the polymerization of an olefin, the titanium containing solid catalytic component is combined with an organo aluminum compound to form a catalyst system.

The organoaluminum compounds have the formula

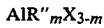

$$AlR''_m X_{3-m}$$

wherein R'' represents a $C_1$–$C_8$ alkyl group which can be the same or different and m represents 1 to 3 and X represents a halogen atom.

Suitable organoaluminum compound used as the auxiliary catalyst in the invention include trialkylaluminum such as trimethylaluminum, triethylaluminum, tripropylaluminum, triisobutylaluminum, trihexylaluminum, trioctylaluminum; dialkylaluminum monohalides such as dimethylaluminum monochloride, diethylaluminum monochloride; alkylaluminum sesquihalides such as methylaluminum sesquichloride, ethylaluminum sesquichloride; dialkylaluminum monoalkoxides such as diethylaluminum monoethoxide, diethylaluminum monomethoxide etc.

It is preferable to use the trialkylaluminum such as triethylaluminum, tripropylaluminum, triisobutylaluminum, trihexylaluminum, trioctylaluminum, etc.

The molar ratio of the organoaluminum to Ti is in a range of 1 to 500 preferably 1 to 100 especially 2 to 50.

In the process of the present invention, the polymerization of an olefin is carried out in the presence of the catalyst system comprising the organoaluminum compound and the titanium containing solid component, if necessary with the known additive for improving stereospecific property.

The additives can be carboxylic esters, phosphoric esters and phosphorous esters. It is preferable to add the carboxylic esters having the formula

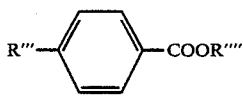

wherein R''' and R'''' respectively represent $C_1$-$C_{10}$ alkyl groups, because the polyolefins having high stereospecific property can be obtained in high polymerization activity.

Suitable carboxylic esters having the formula include methyl p-methylbenzoate, ethyl p-methylbenzoate, propyl p-methylbenzoate, butyl p-methylbenzoate, hexyl p-methylbenzoate, octyl p-methylbenzoate, methyl p-ethylbenzoate, ethyl p-ethylbenzoate, propyl p-ethylbenzoate, butyl p-ethylbenzoate, hexyl p-ethylbenzoate, octyl p-ethylbenzoate, methyl p-butylbenzoate, ethyl p-butylbenzoate, propyl p-butylbenzoate, butyl p-butylbenzoate, hexyl p-butylbenzoate, octyl p-butylbenzoate, methyl p-hexylbenzoate, ethyl p-hexylbenzoate, propyl p-hexylbenzoate, butyl p-hexylbenzoate, hexyl p-hexylbenzoate, octyl p-hexylbenzoate, methyl p-octylbenzoate, ethyl p-octylbenzoate, propyl p-octylbenzoate, butyl p-octylbenzoate, hexyl p-octylbenzoate, octyl p-octylbenzoate, etc. The benzoates having the formula wherein R''' and R'''' represent $C_1$ to $C_4$ alkyl groups are especially effective.

The method of the addition of the additive is not limited. The additive can be added to the organoaluminum compound or the titanium containing solid catalytic component or a mixture thereof.

The molar ratio of the additive to Ti in the titanium containing solid catalytic component is in a range of 0.1–200 preferably 0.1 to 40 especially 1 to 10.

The olefins can be α-olefins such as ethylene, propylene, butene-1, etc.

The polyolefins can be advantageously obtained by a homopolymerization, a random copolymerization or a block copolymerization with two or more monomers with the catalyst system of the invention.

In the copolymerization, it is preferable to use less than 10 wt.% of a comonomer in the copolymer.

The catalyst system of the invention is preferably used in the homopolymerization of propylene or the copolymerization of propylene and the other α-olefin.

In the process of the present invention, the homopolymerization or copolymerization can be carried out by a solution polymerization in an inert hydrocarbon or liquefied propylene, a slurry polymerization or a gaseous polymerization without any solvent. It is possible to add any additive as desired.

The polymerization is carried out at 50° to 100° C. preferably 50° to 80° C. under the pressure from the atmospheric pressure to 100 atm.

The molecular weight of the resulting polyolefin can be controlled by the presence of hydrogen in the polymerization zone.

As described in detail, in accordance with the process of the present invention, the polyolefins having excellent stereospecific property can be easily obtained. Since the stereospecific property of the resulting polyolefin is remarkably high, the separation of amorphous polymer (atactic polymer) from the resulting polyolefin can be eliminated. The titanium containing solid catalytic component used in the present invention has remarkably high polymerization activity. Accordingly, the step of removing the catalyst residue from the resulting polyolefin can be also eliminated, advantageously.

The invention will further illustrated by certain Examples which are provided herein for purpose of illustration only and are not intended to be limiting in any manner unless otherwise specified.

In the Examples and References, the isotactic index (I.I.) was given as a weight percent of a solid residue after an extraction with boiled n-heptane for 6 hours by an improved Soxhlet extractor, and melt index (MFI) was measured by ASTM D-1238.

EXAMPLE 1

(I) Preparation of titanium containing solid catalytic component

In a 500 ml four necked flask which was purged with dry nitrogen gas, 40 m mole diphenylsilanediol and 100 ml of toluene were charged, and 25 ml of di-n-butyl ether solution containing 3.2 m mole/ml chloro-n-butyl magnesium was gradually added to the mixture under throughly stirring at 25° C. After the addition, the mixture was stirred at 25° C. for 1 hour and then, it was heated at 70° C. and it stirred for 1 hour. After cooling the mixture to 25° C., 8 ml of toluene solution containing 1.0 m mole/ml ethyl benzoate was added to the mixture under throughly stirring. After the addition, the mixture was heated to 110° C. and it was stirred for 1.5 hours and then, toluene and di-n-butyl ether was distilled off under a reduced pressure and the residue was dried to obtain white powder.

The resulting white powder was admixed with 800 m mole of titanium tetrachloride and the mixture was heated at 130° C. During the heating, the mixture was changed to black-brown color viscous sintering condition. The reaction mixture was stirred at 130° C. for 0.5 hour, and 200 ml of n-heptane was added to the reaction mixture whereby a large amount of a precipitate was formed. The supernatant was separated and the precipitate was washed with 200 ml of n-heptane for 5 times to obtain a pale yellowish brown solid of the titanium containing solid catalytic component. The titanium content of the resulting solid was 6.8 wt.%.

(II) Polymerization of olefin

The polymerization of olefin was carried out by using the catalytic component prepared by the process (I).

In a 1 liter four necked flask which was purged with dry nitrogen gas, 500 ml of n-heptane, 0.13 m mole of triethyl aluminum and 23.2 mg of the titanium containing solid catalyst prepared by the process of (I) were charged. The molar ratio of Al/Ti was 4.

Then, the mixture was heated to 70° C. under stirring it and propylene gas was introduced under the atmospheric pressure to perform the polymerization for 2 hours. The polymerization was stopped by adding a small amount of i-propyl alcohol. The content was added into methanol and the precipitate was separated and dried to obtain 13.0 g of white powdery polypropylene.

The polymerization activity of the catalyst, K cat. given as K cat.=polymer (g)/Ti cat. component (g)×time (hr.)×propylene pressure (Kg/cm$^2$) was 467 and KTi given as KTi=polymer (g)/titanium (g)×time (hr.)×propylene pressure (Kg/cm$^2$) was 6,870 and the isotactic index (II) was 90.1% and MFI was 2.7.

The results are shown in Table 1.

REFERENCES 1 AND 2

The preparation of titanium containing solid catalytic component was repeated in accordance with the process (I) of Example 1 except using no ethyl benzoate.

The polymerization of propylene was repeated in accordance with the process (II) of Example 1 except varying the molar ratio of Al/Ti to 4 to 30.

The results are shown in Table 1. From the results, it was found that when an electron donor was not added in the preparation of the titanium containing solid catalytic component, the polymerization activity was slightly increased but the isotactic index I.I. was remarkably low.

REFERENCE 3

The preparation of titanium containing solid catalytic component was repeated in accordance with the process (I) of Example 1 except using no ethyl benzoate.

The polymerization of propylene was repeated in accordance with the process (II) of Example 1 except using the catalytic component and adding ethyl benzoate to give the molar ratio of ethyl benzoate/Ti to 1.

The results are shown in Table 1. From the result, it was found that the addition of the electron donor in the preparation of the titanium containing solid catalyst attain excellent advantages in both of the polymerization activity and the stereospecific polymer.

TABLE 1

| | Ti content in solid catalytic component (wt. %) | Al/Ti (molar ratio) | K value K cat. | KTi | I. I. (%) |
|---|---|---|---|---|---|
| Exp. 1 | 6.8 | 4 | 467 | 6,870 | 90.1 |
| Ref. 1 | 5.2 | 4 | 688 | 13,230 | 40.1 |
| Ref. 2 | 5.2 | 30 | 550 | 10,580 | 38.5 |
| Ref. 3 | 5.2 | 4 | 105 | 2,020 | 88.0 |

EXAMPLES 2 TO 3

The polymerization of propylene was repeated in accordance with the process (II) of Example 1 except varying the molar ratio of Al/Ti as shown in Table 2.

The results are shown in Table 2.

TABLE 2

| | Al/Ti (molar ratio) | K value K cat. | KTi | I. I. (%) |
|---|---|---|---|---|
| Exp. 2 | 8 | 550 | 8,090 | 91.0 |
| Exp. 3 | 15 | 582 | 8,560 | 88.6 |

EXAMPLES 4 TO 5

The preparation of titanium containing solid catalytic component was repeated in accordance with the process (I) of Example 1 except varying the molar ratio of ethyl benzoate to chloro-n-butyl magnesium to 0.2.

The titanium content of the catalytic component was 6.3 wt.%.

The polymerization of propylene was repeated in accordance with the process (II) of Example 1 except varying the molar ratio of Al/Ti as shown in Table 3.

The results are shown in Table 3.

TABLE 3

| | Al/Ti (molar ratio) | K value K cat. | KTi | I. I. (%) |
|---|---|---|---|---|
| Exp. 4 | 4 | 620 | 9,840 | 90.7 |
| Exp. 5 | 15 | 510 | 8,100 | 87.5 |

EXAMPLES 6 TO 10

The preparation of the catalytic component was repeated in accordance with the process (I) of Example 1 except using various electron donors shown in Table 4 instead of ethyl benzoate.

The polymerization of propylene was repeated in accordance with the process (II) of Example 1 except using the catalytic component.

The results are shown in Table 4.

REFERENCES 4 AND 5

The polymerization of propylene was repeated in accordance with the process of Reference 3 except using electron donors shown in Table 4 instead of ethyl benzoate.

The results are shown in Table 4.

TABLE 4

| | Electron donor | Ti content in solid catalytic component (wt. %) | K value K cat. | KTi | I. I. (%) |
|---|---|---|---|---|---|
| Exp. 6 | dimethylglycine ethyl ester | 8.3 | 205 | 2,470 | 89.3 |
| Exp. 7 | phenyl acetate | 5.8 | 410 | 7,070 | 87.6 |
| Exp. 8 | ethyl cinnamate | 7.2 | 380 | 5,280 | 88.0 |
| Exp. 9 | tetramethyl ethylenediamine | 9.8 | 110 | 1,120 | 90.5 |
| Exp. 10 | hexamethyl phosphoric acid triamide | 9.6 | 123 | 1,280 | 85.1 |
| Ref. 4 | tetramethyl ethylenediamine | 5.2 | 20 | 380 | 87.3 |
| Ref. 5 | hexamethyl phosphoric acid triamide | 5.2 | 18 | 350 | 80.5 |

EXAMPLES 11 AND 12

The preparation of titanium containing solid catalytic component was repeated in accordance with the process (I) of Example 1 except using 40 m mole of triphenyl silanol instead of diphenyl silanediol and varying the amount of di-n-butyl ether solution containing 3.2 m mole/ml of chloro-n-butyl magnesium, and using phenyl acetate in Example 12.

The polymerization of propylene was repeated in accordance with the process (II) of Example 1 except using the catalytic components.

The results are shown in Table 5.

REFERENCE 6

In accordance with the process of Example 11, the titanium containing solid catalytic component was prepared without using ethyl benzoate, and the polymerization of propylene was carried out.

The results are shown in Table 5.

TABLE 5

| | Electron donor | Ti content of solid catalytic component (wt. %) | K value K cat. | K value KTi | I. I. (%) |
|---|---|---|---|---|---|
| Exp. 11 | ethyl benzoate | 3.0 | 231 | 7,700 | 90.2 |
| Exp. 12 | phenyl acetate | 3.2 | 207 | 6,470 | 89.0 |
| Ref. 6 | — | 2.3 | 260 | 11,300 | 52.5 |

EXAMPLES 13 TO 16

The preparation of titanium containing solid catalytic component was repeated in accordance with the process (I) of Example 1 except using 40 m mole of trimethyl silanol or 40 m mole of triethyl silanol instead of diphenylsilanediol and using 12.5 ml of di-n-butyl ether solution containing 3.2 m mole/ml of chloro-n-butyl magnesium, and using the electron donors shown in Table 6 in Examples 14 and 16 instead of ethyl benzoate.

The polymerization of propylene was repeated in accordance with the process (II) of Example 1 except using the catalytic components. The results are shown in Table 6.

REFERENCES 7 AND 8

The preparation of titanium containing catalytic component was repeated in accordance with the process (I) of Example 1 except using 40 m mole of trimethyl silanol or 40 m mole of triethyl silanol instead of diphenyl silanediol and using 12.5 ml of di-n-butyl ether solution containing 3.2 m mole/ml of chloro-n-butyl magnesium and using no ethyl benzoate.

The polymerization of propylene was repeated in accordance with the process (II) of Example 1 except using the catalytic component.

The results are shown in Table 6.

TABLE 6

| | Silanol | Electron donor | Ti content in solid catalytic Component (wt. %) | K value K cat. | K value KTi | I. I. (%) |
|---|---|---|---|---|---|---|
| Exp. 13 | trimethyl silanol | ethyl benzoate | 6.6 | 385 | 5,830 | 86.1 |
| Exp. 14 | trimethyl silanol | phenyl acetate | 6.4 | 320 | 5,000 | 87.5 |
| Exp. 15 | triethyl silanol | ethyl benzoate | 7.1 | 610 | 8,590 | 89.5 |
| Exp. 16 | triethyl silanol | phenyl acetate | 6.7 | 511 | 7,630 | 91.0 |
| Ref. 7 | trimethyl silanol | — | 5.9 | 494 | 8,370 | 37.1 |
| Ref. 8 | triethyl silanol | — | 5.3 | 665 | 12,550 | 40.5 |

EXAMPLE 17

(I) Synthesis of polyphenylsilanol

In a 500 ml four necked flask, 3.2 g of deionized water and 170 ml of toluene were charged. The flask was cooled to −20° C. under stirring with a magnetic stirrer.

A 70 ml of toluene solution containing 25 g (0.118 mole) of phenyltrichlorosilane was added dropwise through a dropping funnel to the mixture during 1 hour. After the addition, the reaction mixture was heated to 0° C. and the mixture was stirred for 30 minutes. Then, the toluene solution was washed with ice water to become neutral. The resulting toluene solution was dehydrated and dried with anhydrous sodium sulfate and it was filtered and the filtrate was used as the starting material for preparing the carrier. The hydroxyl group content in the toluene solution was measured by the below mentioned method to give 8.1 m mole/g.

The hydroxyl group of the polysilanol was measured as follows.

Suitable amount of Grignard reagent was added to the solution so as to be excess to hydroxyl groups, and the mixture was heated at 100° C. for 1 hour under stirring it to complete the reaction.

The flask was cooled to the room temperature and deionized water was added to hydrolyze the reaction product. The resulting basic component was titrated in the presence of suitable indicator with hydrochloric acid or sulfuric acid. In this case, phenolphthalein-alcohol solution was used as the indicator and 0.1N—HCl was used as the acid.

(II) Preparation of titanium containing solid catalytic component

In a 300 ml four necked flask, which was purged with dry nitrogen, 17 ml of toluene solution containing 0.34 mole/liter per hydroxyl group of the polyphenylsilanol prepared by the process (I) was charged, and 1.5 ml of di-n-butyl ether solution containing 3.9 mole/liter of chloro-n-butyl magnesium was added dropwise at 25° C. under throughly stirring it. After the addition, the mixture was aged by stirring it at 110° C. for 1 hour. After cooling it to 25° C., 1.2 ml of toluene solution containing 0.5 mole/liter ethyl benzoate (molar ratio of ethyl benzoate to Mg atom of 0.1) was added dropwise to the mixture under stirring it. After the addition, the reaction mixture was heated at 100° C. and it was stirred for 2 hours. Then, toluene and di-n-butyl ether were distilled off under a reduced pressure and the residue was dried to obtain white powder. The resulting white powder was admixed with 120 m mole of titanium tetrachloride and the mixture was heated at 130° C. under stirring it. During the heating, the mixture was changed to black-brown color viscous sintering condition. The reaction mixture was stirred at 130° C. for 0.5 hour, and then 150 ml of n-heptane was added to the reaction mixture whereby a large amount of a precipitate was formed. The supernatant was separated and the precipitate was washed with 150 ml of n-heptane for 5 times to obtain a gray brown solid of the titanium containing solid catalytic component.

The titanium content of the resulting solid was 2.5 wt.% and the chlorine content was 37.8 wt.%.

(III) Polymerization of olefin

The polymerization of olefin was carried out by using the catalytic component prepared by the process (II).

In a 500 ml four necked flask which was purged with dry nitrogen gas, 300 ml of n-heptane and 0.12 m mole of triethylaluminum and 29 mg of the titanium containing solid catalytic component prepared by the process (II) were charged.

Then, the mixture was heated to 70° C. under stirring it and propylene gas was introduced under the atmospheric pressure to perform the polymerization for 2 hours. The polymerization was stopped by adding a small amount of methanol. The content was added into methanol and the precipitate was separated and dried to obtain 17 g of white powdery polypropylene.

The polymerization activity of the catalyst, K cat. was 489 and KTi was 19,600, and the isotactic index (II) was 90.2% and MFI was 2.7.

REFERENCES 9 AND 10

The preparation of titanium containing catalytic component was repeated in accordance with the process (II) of Example 17 except using no ethyl benzoate.

The polymerization of propylene was repeated in accordance with the process (III) of Example 17 except varying the molar ratio of triethylaluminum/titanium (hereinafter referring to Al/Ti) to 8 or 25.

The results are shown in Table 7 with the results of Example 17. From the results, it was found that when an electron donor was not added in the preparation of the titanium containing solid catalytic component, the isotactic index was remarkably low.

REFERENCE 11

The preparation of titanium containing solid catalytic component was repeated in accordance with the process (II) of Example 17 except using no ethyl benzoate.

The polymerization of propylene was repeated in accordance with the process (III) of Example 17 except using the catalytic component and adding ethyl benzoate to give the molar ratio of ethyl benzoate to Ti to 1.0.

The results are shown in Table 7. From the result, it was found that the polymerization activity was remarkably low in the process of Reference 11.

TABLE 7

|  | Ti content in solid catalytic component (wt. %) | Al/Ti (molar ratio) | K value K cat. | KTi | I. I. (%) |
|---|---|---|---|---|---|
| Exp. 17 | 2.5 | 8 | 489 | 19,600 | 90.2 |
| Ref. 9 | 2.1 | 8 | 720 | 34,300 | 42.4 |
| Ref. 10 | 2.1 | 25 | 576 | 27,400 | 39.3 |
| Ref. 11 | 2.1 | 8 | 70 | 3,330 | 85.9 |

EXAMPLES 18 AND 19

The polymerization of propylene was repeated in accordance with the process (III) of Example 17 except varying the molar ratio of Al/Ti as shown in Table 8.

The results are shown in Table 8.

TABLE 8

|  | Al/Ti (molar ratio) | K value K cat. | KTi | I. I. (%) |
|---|---|---|---|---|
| Exp. 18 | 5 | 171 | 6,840 | 97.0 |
| Exp. 19 | 10 | 689 | 27,600 | 89.7 |

EXAMPLE 20

The preparation of the titanium containing solid catalytic component was repeated in accordance with the process (II) of Example 17 except varying a molar ratio of ethyl benzoate to Mg to 1.0 and washing the product with 30 ml of n-heptane for 5 times after the treatment with ethyl benzoate. The titanium content in the catalytic component was 1.5 wt.%.

The polymerization of propylene was repeated in accordance with the process (III) of Example 17. As the results, K cat. was 478 and KTi was 31,900 and I.I. was 89.2%.

EXAMPLES 21 TO 25

The preparation of the titanium containing solid catalyst component was repeated in accordance with the process (II) of Example 17 except using various electron donors shown in Table 9.

The polymerization of propylene was repeated in accordance with the process (III) of Example 17 except using the catalytic component. The results are shown in Table 9.

REFERENCES 12 AND 13

The polymerization of propylene was repeated in accordance with the process of Reference 11 except using electron donors shown in Table 9 instead of ethyl benzoate.

The results are shown in Table 9.

TABLE 9

|  | Electron donor | Ti content in solid catalytic component (wt. %) | K value K cat. | KTi | I. I. (%) |
|---|---|---|---|---|---|
| Exp. 21 | dimethylglycine ethyl ester | 3.1 | 215 | 6,940 | 92.4 |
| Exp. 22 | phenyl acetate | 2.1 | 429 | 20,430 | 90.6 |
| Exp. 23 | ethyl cinnamate | 2.6 | 398 | 15,310 | 91.0 |
| Exp. 24 | tetramethyl ethylene diamine | 3.6 | 115 | 3,190 | 93.6 |
| Exp. 25 | hexamethyl phosphoric acid triamide | 3.5 | 129 | 3,690 | 88.0 |
| Ref. 12 | tetramethyl ethylene diamine | 2.1 | 21 | 1,000 | 84.5 |
| Ref 13 | hexamethyl phosphoric acid triamide | 2.1 | 19 | 900 | 83.3 |

EXAMPLES 26 AND 27

In a 1 liter four necked flask, 50 ml of an aqueous solution containing 5.9 g (0.148 mole) of sodium hydroxide and 300 ml of toluene were charged and the flask was cooled to 0° C. A 80 ml of toluene solution containing 25 g (0.118 mole) of phenyltrichlorosilane was added dropwise through a dropping funnel to the mixture during 1 hour under stirring. After the addition, the mixture was stirred at 0° C. for 30 minutes. The toluene solution was washed with 70 ml of ice water for 5 times and the washing was confirmed to be neutral. The resulting toluene solution of polysilanol was dehydrated with molecular sieve and was dried. The product was used for the preparation of the carrier.

The content of hydroxyl groups measured in accordance with the process (I) of Example 17 was 8.5 m mole/g.

The preparation of titanium containing solid catalytic component was repeated in accordance with the process (II) of Example 17 except using the resulting polysilanol as the polysilanol in the preparation of the carrier. The titanium content of the catalytic component was 2.3 wt.%.

The polymerization of propylene was repeated in accordance with the process (III) of Example 17 except varying the molar ratio of Al/Ti as shown in Table 10.

The results are shown in Table 10.

TABLE 10

|  | Al/Ti (molar ratio) | K value K cat. | KTi | I. I. (%) |
|---|---|---|---|---|
| Exp. 26 | 3 | 316 | 13,200 | 94.3 |
| Exp. 27 | 4 | 507 | 22,040 | 90.1 |

EXAMPLES 28 AND 29

The preparation of titanium containing solid catalytic component was repeated in accordance with the process of Example 26 except heat-treating the polysilanol at 110° C. for 2 hours. The titanium content of the catalytic component was 2.3 wt.%.

The polymerization of propylene was repeated in accordance with the process (III) of Example 17 except varying the molar ratio of Al/Ti as shown in Table 11. The results are shown in Table 11.

TABLE 11

|  | Al/Ti (molar ratio) | K value K cat. | KTi | I. I. (%) |
|---|---|---|---|---|
| Exp. 28 | 7 | 434 | 18,900 | 88.2 |
| Exp. 29 | 12 | 417 | 18,100 | 90.3 |

EXAMPLES 30 AND 31

In accordance with the process (I) of Example 17 except using 0.12 mole of methyl trichlorosilane instead of phenyl trichlorosilane, the hydrolysis was carried out and the toluene solution of polymethylsilanol was prepared. The preparation of titanium containing solid catalytic component was repeated in accordance with the process (II) of Example 17 except using the solution.

On the other hand, the preparation of the catalytic component was repeated in accordance with the process except using butyl benzoate instead of ethyl benzoate in Example 17.

The polymerization of propylene was repeated in accordance with the process (III) of Example 17 except using the catalytic component.

The results are shown in Table 12.

REFERENCE 14

The preparation of titanium containing solid catalytic component was repeated in accordance with the process of Example 30 except using no ethyl benzoate. The polymerization of propylene was repeated by using the catalytic component. The results are shown in Table 12.

TABLE 12

|  | Electron donor | Ti content in solid catalytic component (wt. %) | K value K cat. | KTi | I. I. (%) |
|---|---|---|---|---|---|
| Exp. 30 | ethyl benzoate | 2.9 | 381 | 13,100 | 90.3 |
| Exp. 31 | butyl benzoate | 3.1 | 341 | 11,000 | 89.1 |
| Ref 14 |  | 2.2 | 429 | 19,500 | 41.4 |

EXAMPLES 32 TO 35

In accordance with the process (I) of Example 17 except using 0.12 mole of ethyltrichlorosilane or 0.12 mole of benzyltrichlorosilane instead of phenyl trichlorosilane, the hydrolysis was carried out to prepare polyethylsilanol or polybenzylsilanol.

The preparation of titanium containing solid catalytic component was repeated in accordance with the process (II) of Example 17 except using the resulting polyethylsilanol or polybenzylsilanol.

On the other hand, the preparation of the catalytic component was repeated in accordance with the process except using methyl benzoate instead of ethyl benzoate in Examples 33 and 35.

The polymerization of propylene was repeated in accordance with the process (III) of Example 17.

The results are shown in Table 13.

TABLE 13

|  | Poly-silanol | Electron donor | Ti content in solid catalytic component (wt. %) | K value K cat. | KTi | I. I. (%) |
|---|---|---|---|---|---|---|
| Exp. 32 | polyethylsilanol | ethyl benzoate | 2.6 | 412 | 15,800 | 90.7 |
| Exp. 33 | polyethylsilanol | methyl benzoate | 2.5 | 342 | 13,680 | 88.6 |
| Exp. 34 | polybenzylsilanol | ethyl benzoate | 2.9 | 418 | 14,400 | 90.5 |
| Exp. 35 | polybenzylsilanol | methyl benzoate | 2.7 | 350 | 12,960 | 92.0 |

EXAMPLES 36 AND 37

In accordance with the process (I) of Example 17 except using 0.06 mole of phenyltrichlorosilane and 0.06 mole of diphenyl dichlorosilane as the organic halosilane, the hydrolysis was carried out to obtain polysilanol. The content of hydroxyl group in the carrier measured by the method of Example 17 was 6.7 m mole/g.

The preparation of titanium containing solid catalytic component was repeated in accordance with the process (II) of Example 17 except using the toluene solution of polysilanol.

On the other hand, the preparation of the catalytic component was repeated in accordance with the process of Example 36 except using ethyl orthotoluate

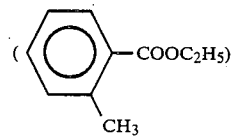

instead of ethyl benzoate.

The polymerization of propylene was repeated in accordance with the process (III) of Example 17 except using the catalytic components.

The results are shown in Table 14.

REFERENCE 15

In accordance with the process of Example 36 except using no ethyl benzoate, the catalytic component was prepared and the polymerization of propylene was repeated.

The results are shown in Table 14.

EXAMPLES 38 AND 39

In accordance with the process of Example 36 except using 0.06 mole of dimethyl dichlorosilane instead of diphenyl dichlorosilane, the hydrolysis was carried out to prepare polysilanol. The content of hydroxyl group was 6.1 m mole/g. The preparation of titanium containing solid catalytic component was repeated in accordance with the process (II) of Example 17 except using the toluene solution of polysilanol.

On the other hand, the preparation of the catalytic component was repeated in accordance with the process of Example 38 except using methyl benzoate instead of ethyl benzoate.

The polymerization of propylene was repeated in accordance with the process (III) of Example 17 except using the catalytic components.

The results are shown in Table 14.

REFERENCE 16

In accordance with the process of Example 38 except using no ethyl benzoate, the titanium containing catalytic component was prepared and the polymerization of propylene was carried out.

The results are shown in Table 14.

EXAMPLES 40 AND 41

The preparation of titanium containing solid catalytic component was repeated in accordance with the process (II) of Example 17 except using a xylene solution containing 120 m mole of titanium tetrachloride in a concentration of 4.6 m mole/liter.

On the other hand, the preparation of the catalytic component was repeated in accordance with the process of Example 40 except using butyl benzoate instead of ethyl benzoate.

The polymerization of propylene was repeated in accordance with the process (III) of Example 17.

The results are shown in Table 15.

REFERENCE 17

In accordance with the process of Example 40 except using no ethyl benzoate, the catalytic component was prepared and the polymerization of propylene was carried out. The results are shown in Table 15.

EXAMPLE 42

In a 300 ml four necked flask which was purged with dry nitrogen gas, 17 ml of the toluene solution of polyphenylsilanol prepared by the process (I) of Example 17 (0.34 mole/liter of content of hydroxyl group) and 1.2 ml of the toluene solution of ethyl benzoate (molar ratio of ethyl benzoate to Mg atom of 0.1) were charged and were cooled to $-50°$ C. A 1.5 ml of di-n-butyl ether solution containing 3.9 mole/liter of chloro-n-butyl magnesium was added dropwise to the mixture at $-50°$ C. under throughly stirring.

After the addition, the mixture was heated to 80° C. and stirred for 1 hour for the purpose of ageing.

Toluene and di-n-butyl ether was distilled off and the residue was dried to obtain white powder.

The preparation of titanium containing solid catalytic component was repeated in accordance with the process (II) of Example 17 except treating the white powder with 120 m mole of titanium tetrachloride. The content of titanium in the catalytic component was 3.1 wt.%.

The polymerization of propylene was repeated in accordance with the process (III) of Example 17 except using the catalytic component.

The results are shown in Table 15.

TABLE 14

| | Electron donor | Ti content in solid catalytic component (wt. %) | K value K cat. | K value KTi | I. I. (%) |
|---|---|---|---|---|---|
| Exp. 36 | ethyl benzoate | 2.3 | 412 | 17,900 | 92.1 |
| Exp. 37 | ethyl ortho toluate | 2.5 | 369 | 14,700 | 91.8 |
| Ref. 15 | — | 1.9 | 464 | 24,400 | 42.5 |
| Exp. 38 | ethyl benzoate | 2.8 | 385 | 13,750 | 91.3 |
| Exp. 39 | methyl benzoate | 2.7 | 320 | 11,850 | 92.3 |
| Ref. 16 | — | 2.3 | 434 | 18,870 | 40.8 |

TABLE 15

| | Electron donor | Ti content in solid catalytic component (wt. %) | K value K cat. | K value KTi | I. I. (%) |
|---|---|---|---|---|---|
| Exp. 40 | ethyl benzoate | 3.8 | 413 | 10,870 | 91.6 |
| Exp. 41 | butyl benzoate | 4.1 | 370 | 9,020 | 90.0 |
| Ref. 17 | — | 3.1 | 465 | 15,000 | 39.2 |
| Exp. 42 | ethyl benzoate | 3.1 | 461 | 14,870 | 91.2 |

EXAMPLE 43

The preparation of the titanium containing solid catalytic component was repeated in accordance with the process (I) of Example 1 except using 40 m mole of triphenyl silanol instead of diphenyl silanediol and varying the amount of di-n-butyl ether solution containing 3.2 m mole/ml of chloro-n-butyl magnesium to 12.5 ml. The solid catalytic component having 3.0 wt.% of the titanium content was obtained.

The polymerization of propylene was repeated in accordance with the process (III) of Example 17 except using 30.1 mg of the resulting solid catalytic component and 0.19 m mole of triethylaluminum and adding 0.03 m mole of methyl p-methylbenzoate.

As the results, K cat. was 352, KTi was 11,700 and I.I. was 95.1%.

EXAMPLE 44

The polymerization of propylene was repeated in accordance with the process (III) of Example 17 except using 0.19 m mole of triethylaluminum and 30.1 mg of the titanium containing solid catalytic component and adding 0.03 m mole of methyl p-methylbenzoate, to obtain 17 g of white powdery polypropylene. As the results, K cat. was 471, KTi was 18,800 and I.I. was 96.1%.

EXAMPLES 45 TO 49

The polymerization of propylene was repeated in accordance with the process of Example 44 except using electron donors shown in Table 16 instead of methyl p-methylbenzoate.

The results are shown in Table 16.

TABLE 16

| | Electron donor | Ti content in solid catalytic component (wt. %) | K value K cat. | K value KTi | I. I. (%) |
|---|---|---|---|---|---|
| Exp. 45 | ethyl p-methyl benzoate | 2.5 | 451 | 18,000 | 96.0 |
| Exp. 46 | n-butyl p-methyl-benzoate | 2.5 | 396 | 15,800 | 96.5 |
| Exp. 47 | methyl p-ethyl-benzoate | 2.5 | 440 | 17,600 | 96.2 |
| Exp. 48 | ethyl p-ethyl-benzoate | 2.5 | 467 | 18,700 | 95.6 |
| Exp. 49 | methyl p-t-butyl-benzoate | 2.5 | 492 | 19,700 | 95.5 |

EXAMPLE 50

The polymerization of propylene was repeated in accordance with the process (II) of Example 17 in the following condition.

In a 2 liters autoclave equipped with a magnetic stirrer, which was purged with nitrogen gas, 400 ml of n-hexane, 0.4 m mole of triethylaluminum, 21 mg of the titanium containing solid catalytic component of Example 17 and 0.08 m mole of methyl p-methylbenzoate were charged. The autoclave was heated to 60° C. and 0.5 Kg/cm$^2$ of hydrogen gas was compressed and then propylene was introduced to polymerize it for 2 hours under maintaining the propylene pressure of 17 Kg/cm$^2$. The polymerization was stopped by adding a small amount of isopropyl alcohol. The unreacted propylene was purged and the product was dried to obtain 228 g of white powdery polypropylene. As the results, K cat. was 319; KTi was 12,770; the catalytic efficiency CE(polymer(g)/Ti(g)) was 434,300; I.I. was 94.3% and MFI was 5.2.

What is claimed is:

1. A process for polymerizing an alpha-olefin having at least three carbon atoms comprising contacting said olefin with a catalyst prepared by mixing:
   (A) an organoaluminum compound with
   (B) a solid titanium containing composition, said solid titanium composition being prepared by
   (1) reacting organomagnesium compound having the formula R—Mg—X wherein R is hydrocarbon and X is halogen, with a silanol of the formula RnSi(OH)$_{4-n}$ wherein n is 1, 2 or 3, at a molar ratio of hydroxyl groups to Mg—C bonds of 0.1/1 to 10/1,
   (2) reacting the reaction product of (1) with a carboxylic acid ester at a molar ratio of ester to Mg of 0.01/1 to 10/1, and
   (3) reacting the reaction product of (2) in a suitable solvent with a titanium tetrahalide at a molar ratio of Ti/Mg of 0.1/1 to 50/1, the amount of Ti in the composition (B) being 0.1 to 20 weight percent.

2. The process of claim 1 wherein the olefin is propylene.

3. The process of claim 1 wherein the olefin is a mixture of propylene and another α-olefin.

4. The process of claim 1 wherein the titanium containing solid catalytic component is prepared by reacting (a) the silanol compound with (b) the Grignard reagent in the presence of (d) one or more electron donor and then treating the reaction mixture with (c) the titanium tetrahalide.

5. The process of claim 1 wherein the titanium containing solid catalytic component is prepared by reacting (a) the silanol compound with (b) the Grignard reagent and then, adding (d) the electron donor to the reaction mixture and then adding (c) the titanium tetrahalide to the mixture.

6. The process of claim 1 wherein (d) the electron donor is a carboxylic ester.

* * * * *